E. FORLANINI.
MOTOR DRIVEN AIRSHIP.
APPLICATION FILED SEPT. 14, 1914.

1,254,399.

Patented Jan. 22, 1918.
6 SHEETS—SHEET 1.

UNITED STATES PATENT OFFICE.

ENRICO FORLANINI, OF MILAN, ITALY.

MOTOR-DRIVEN AIRSHIP.

1,254,399.  Specification of Letters Patent.  Patented Jan. 22, 1918.

Application filed September 14, 1914. Serial No. 861,608.

*To all whom it may concern:*

Be it known that I, ENRICO FORLANINI, a subject of the King of Italy, resident of Milan, in the Kingdom of Italy, No. 21 Via Boccaccio, have invented new and useful Improvements in Motor-Driven Airships, of which the following is a specification.

The present invention has for its main object the direct transmission of the upward pressure of the gas—which mainly acts on the top portion of the envelop—to a limited number of points of the lower portion of the balloon, where it is utilized to support a rigid lattice girder adherent to the balloon or even located either partially or totally inside of it, this girder serving as a support for the driving and steering gear. In this way, the present invention aims to do away with the deformation of the transverse sections of the balloon that takes place in non-rigid and semi-rigid dirigibles, and to suppress the external suspensions and stiffening parts to the profit of the airship's air-penetrating qualities.
These objects are realized essentially by the adoption of longitudinal canvas-diaphragms variously arranged in the shape of a fan, which take up the upward pressure at the periphery of the envelop and transmit it to one or more center lines, from whence it is transmitted to the girder knots in various ways as herein below described.

These longitudinal diaphragms, crossing the transverse diaphragms or partitions which divide the balloon into several sections, hold the said transverse diaphragms in position, thus immobilizing the gaseous mass. This most advantageous condition is completed, as far as regards the bottom where the air pocket necessarily exists, by providing an elastic partition or by the use of elastic ties, one end of which is attached to the top of the envelop and the other to the just mentioned diaphragm separating the air pocket from the gas chamber.

The invention is shown in the annexed drawings by way of example in some of its constructional forms.

In said drawings:

Figures 1, 2:
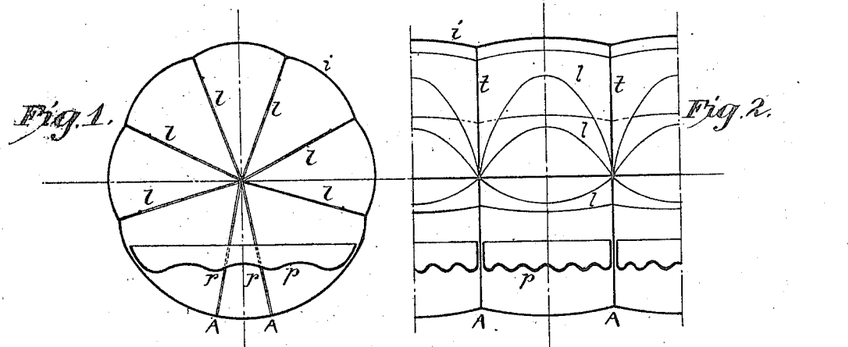
Figures 1 and 2 show in cross-section and side sectional elevation, a constructional form of a portion of a balloon according to my invention, having radially - arranged longitudinal diaphragms, transverse diaphragms and a horizontal partition.

In the arrangement according to Figs. 1 and 2 —t— are the circular gas tight transverse diaphragms dividing the balloon into independent chambers, and —l— are the longitudinal slack diaphragms arranged radially with respect to the axis of the envelop. The canvas of each longitudinal diaphragm l is limited at its inner edge by a rope catenary, the ends of which are secured to the centers of the transverse diaphragms —t—, so that every static or dynamic, internal or external action tending to displace the gaseous mass exerted on the envelop proper —i— is concentrated in the said centers. From each of these centers two resistance lines —r— are carried down (in the plane of the respective diaphragms t) past the envelop; to the lower ends A of these lines —r— a concentrated stress can therefore be applied. The centers of the diaphragms —t—, with which the ends of the catenaries of diaphragms —l— coincide, are connected with one another by an axial rope extending past the envelop both fore and aft.

In each compartment, at a suitable distance below the center line, a movable partition —p— is provided, this partition separating the gas chamber from the underlying air chamber.

Figure 3:
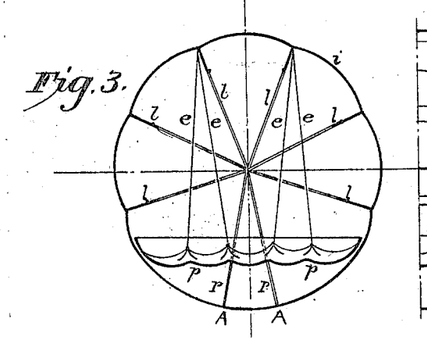
Figs. 3 and 4 show in cross-section and side sectional elevation, another constructional form, having vertical elastic suspension ties for the horizontal partition.
Figure 4:
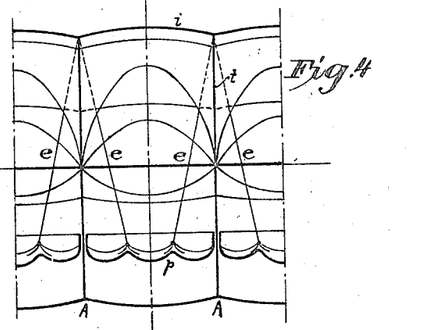
Figure 5:
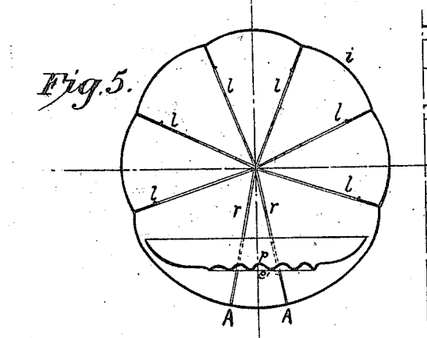
Figs. 5 and 6 show in cross-section and side sectional elevation, still another constructional form, having horizontal elastic suspension ties for the horizontal partition.
Figure 6:
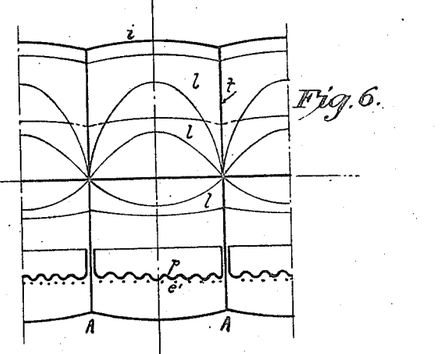

In the arrangement according to Figs. 1 and 2 the said partition —p— is free and slack; in the arrangement according to Figs. 3 and 4 it is held upward by the action of elastic ties e; in the arrangement according to Figs. 5 and 6 it is subjected to the action of elastic ties e' lying in its own plane. With the two latter arrangements a positive pressure of the gas on the upper face of the partition or diaphragm —p— is brought about, this pressure being advantageous inasmuch as it lessens the absorption of air through said partition —p— and also lessens the longitudinal motions of the gas when the airship is pitching.

Figure 7:
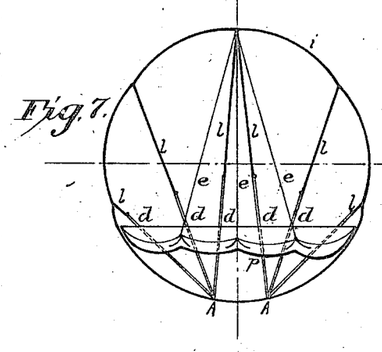
Figs. 7 and 8 show in cross-section and side sectional elevation, another constructional form, having the longitudinal diaphragms radiating from lines on the lower part of the envelop.
Figure 8:
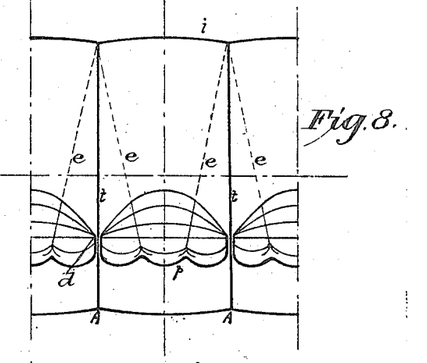

In the arrangement according to Figs. 7 and 8 the longitudinal diaphragms —l— radiate from two lower meridians A of the envelop in the shape of two symmetrical fans; in this case the catenaries by which the longitudinal diaphragms are limited below have their ends secured at d on the diaphragms —t— and from the points d resistance-lines are carried down to the points A for the object of allowing of the free movement of diaphragm —p— of the air chamber. Diaphragm —p— may be either free or elastically secured in the manner already described.

In the arrangement according to Figs. 9 and 10 the diaphragms —l— are not limited below by catenaries concentrating the stresses at certain points of diaphragms —t—, but are plain till they reach the axis of the envelop, where they are all connected together by a continuous axial belt; from this belt two strong plain canvasses, limited by catenaries below, are carried down, which transmit to and concentrate at points A the stresses arising from the diaphragms —l—. In this case the diaphragm —p— of the air chamber, which may be either free or elastically secured, is divided into two portions that are united together along the axial belt or slightly therebeneath.

Figure 11:
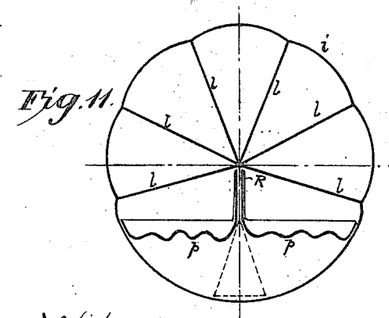
Figs. 11 and 12 show in cross- and side section, another construction where the longitudinal diaphragms carry the girder by means of a single canvas.
Figure 12:
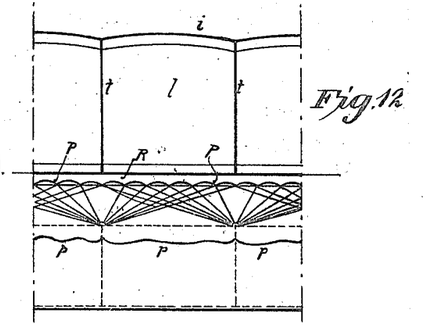

Figs. 11 and 12 represent a similar arrangement in which, however, a single strong canvas strap R is carried down from the axial belt, the duty of canvas R being to transmit the upward pressure or lift to the girder; this arrangement is specially preferably in the case of a triangularly shaped girder arranged inside of the balloon. In this case the upward pressure transmitted downward through canvas R can be concentrated on the knots by means of a canvas suspended from the axial rope, the lower edge of which canvas is limited by a series of catenaries having a span equaling the width of the girder bays. However it is preferably concentrated at many points P near to each other by means of catenaries of small, equal spans, and from these points is transmitted to the girder knots by means of ropes radiating from the said knots, the rope stretches making even a wide angle with the vertical and being so arranged that each end of the catenaries of the canvas R is held by two ropes; this arrangement is very advantageous when the airship is pitching.

In the arrangements hereinbefore described the condition of inflation of the gas chamber and the pressure within the air chamber have a great influence on the form actually assumed by the envelop, which form is therefore liable to alter itself according to the alterations of the said conditions. In certain cases this deformation may be very unwelcome and intolerable, and in such cases it may be obviated by the addition of lateral stiffening diaphragms.

Figure 13:
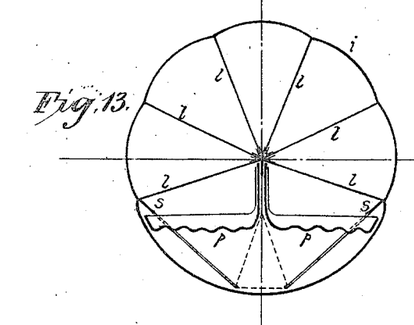
Figs. 13 and 14 show in cross- and side section, another constructional form having lateral stiffening diaphragms.
Figure 14:
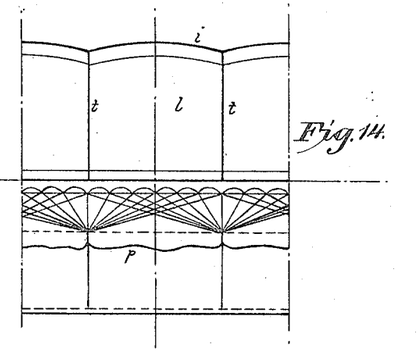

Figs. 13 and 14 show the arrangement of these diaphragms in the case of an envelop built up, as for the rest, according to Figs. 11 and 12. The side partitions —s— are integral with the envelop along the same meridians as those to which are attached the diaphragms —l— and are limited below by flat catenaries connected to resistance lines arranged in the transverse planes —t—, these resistance lines transmitting the stresses directly to the girder knots.

Figure 15:
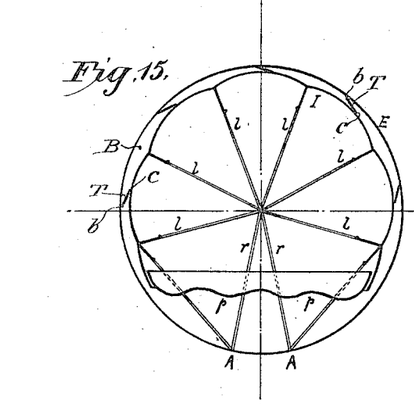
Figs. 15 and 16 show in cross- and side section, a constructional form in which an outer envelop is made integral with an inner envelop.
Figure 16:
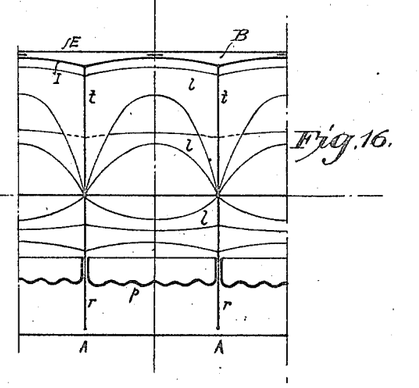

Figs. 15 and 16 show the combination of an indeformable, diaphragm envelop I with a counter-envelop E coaxial therewith, the object of the counter-envelop being essentially that of providing an air-space B around the gas mass in order to reduce the expansion due to heat. Regulation of the air-space is secured by a double belt T connecting the counter-envelop E to the gas bag I and by suitable distance pieces. Said belt T can be formed by two strips adjustably connected by strings, the upper or inner edge c of the belt engaging the periphery of the envelop I, while the lower or outer edge b of said belt similarly engages the periphery of the counter-envelop E, such arrangement enabling the counter-envelop being suspended and maintained concentric with relation to the envelop I. The air space surrounding the whole gas bag may and, generally, will be vigorously ventilated by an air current supplied by a fan or by the motion of the airship herself.

Figure 17:
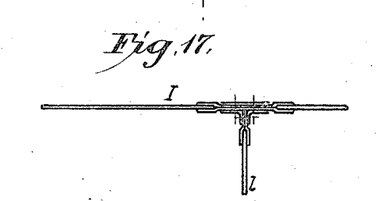
Figs. 17, 18, 19, 20 and 21 show some constructions of strips for connecting the diaphragms and the envelop with one another.
Figure 18:
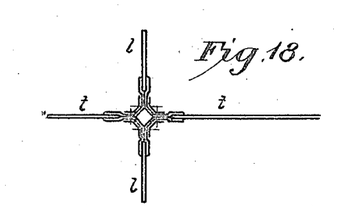
Figures 19, 20, 21, 22, 23, 24, 25:
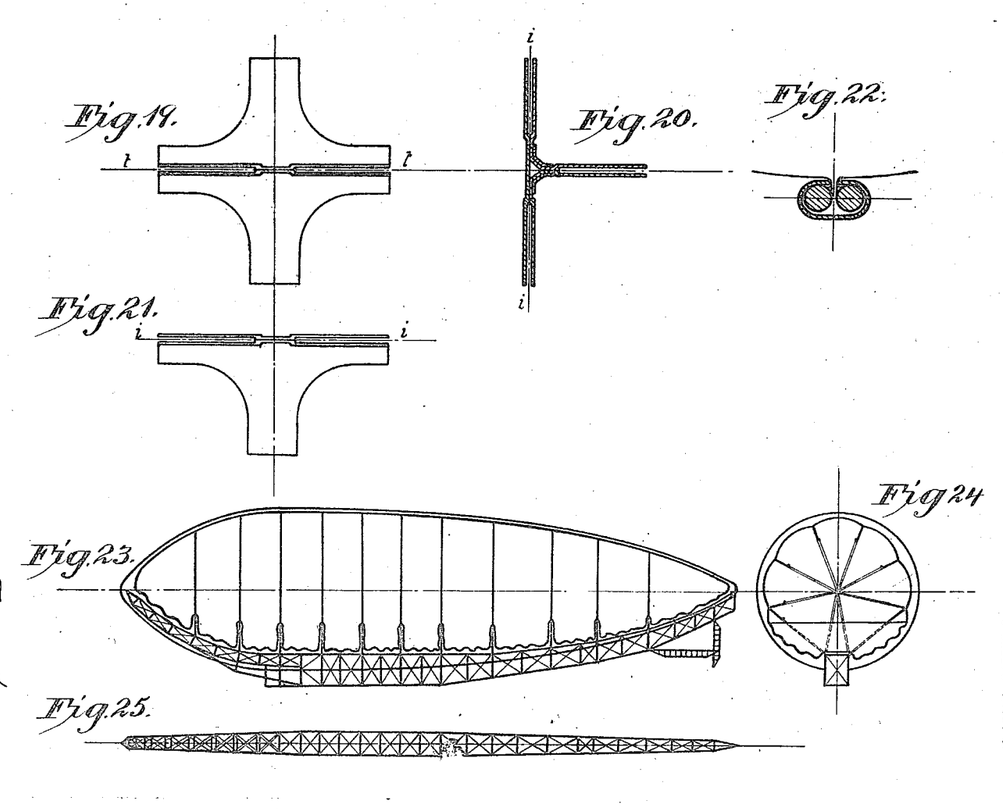
Fig. 22 shows an arrangement for joining the edges of the outer wall of the air chamber, to enable a sudden opening and shutting of the aperture provided in said wall.
Figs. 23 and 24 show in side and cross-section, a double envelop balloon and the girder supported by the internal diaphragm structure.
Fig. 25 is a plan view of the said girder.

In an envelop fitted with diaphragms crossing one another as described the practical construction and perfect gas tightness along the various intersection lines are obtained by the adoption of T shaped and cross-shaped strips and angular members separately prepared, with which elements a continuous skeleton of the gas bag is made. Fig. 17 shows the T shaped strip for the intersections of diaphragms —t— and —l— with the cover's outer surface; Fig. 18 shows the cross-shaped strip for the intersections of diaphragms —t— and —l— with one another; Figs. 19, 20 and 21 show the junction knots of the T shaped strips at the points of the outer envelop that are reached by the radial intersections of a diaphragm —t— with a diaphragm —l—. These strips and knots are made of impermeable canvas, the seams being lap-jointed or rendered impermeable by means of vulcanized rubber.

An indeformable diaphragm envelop made after one or the other of the methods described lends itself very well for the direct combination with the rigid girder that is employed to carry all the mechanical parts of the dirigible, this girder being capable of being directly suspended by its own knots from the above specified knots of the envelop.

The rigid girder can be arranged either totally outside of the envelop—whether the latter be single or double—or partly outside and partly inside of the envelop, or totally inside of it; in the two latter cases the girder portion situated inside of the envelop is disposed within the envelop's air chamber. The indeformability of the envelop allows of the absolute exclusion of any suspension rope or retaining rope outside of the envelop, although a very small section be provided for the girder.

Figs. 23, 24 and 25 show the combination of an indeformable balloon provided with a double envelop and diaphragms, and a girder extending from head to stern situated entirely inside ahead, and partly inside and partly outside from amidships to the stern of the airship. In this case the body of the outside portion of the girder may afford accommodation for the pilots, engines, passengers' stores, etc. and cabins; the supports of the propellers, rudders, etc. are directly carried by the girder and integral with it.

Figure 9:
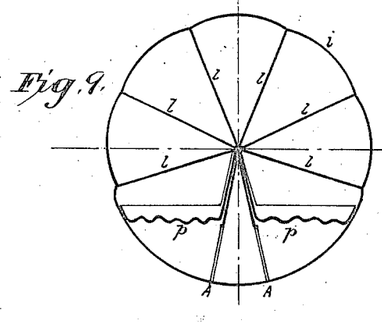
Figs. 9 and 10 show in cross- and side section, a simpler constructional form.
Figure 10:
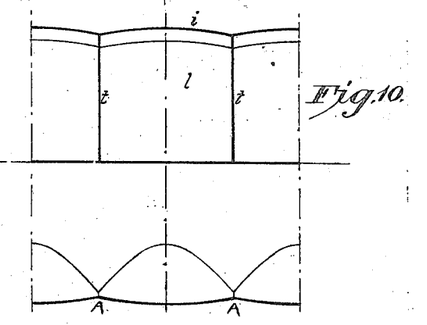
Figures 26, 28:
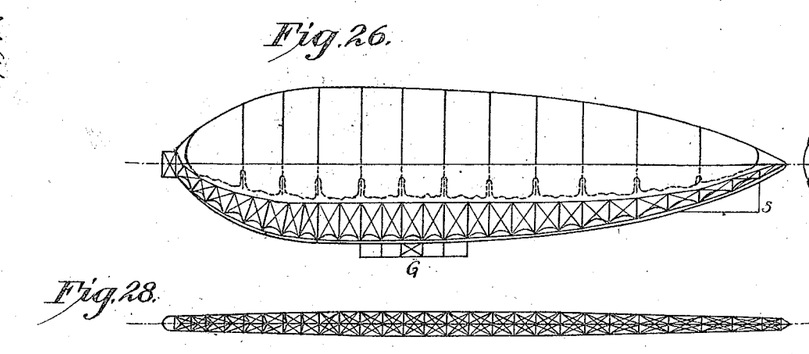
Figs. 26, 27 and 28 show a single envelop balloon and girder supported therefrom.
Figure 27:
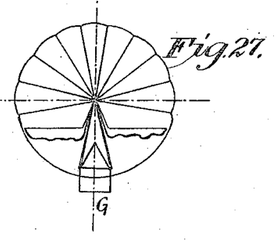

Figs. 26, 27 and 28 show the combination of a balloon provided with a single envelop and diaphragms according to Figs. 9 and 10, and a rigid girder of triangular section located entirely inside of the envelop. From this rigid internal girder project, either as actually integral with it or as detachable parts, the cabins G, the propeller support and the frame supporting the rudders S.

Figures 29, 30, 31:
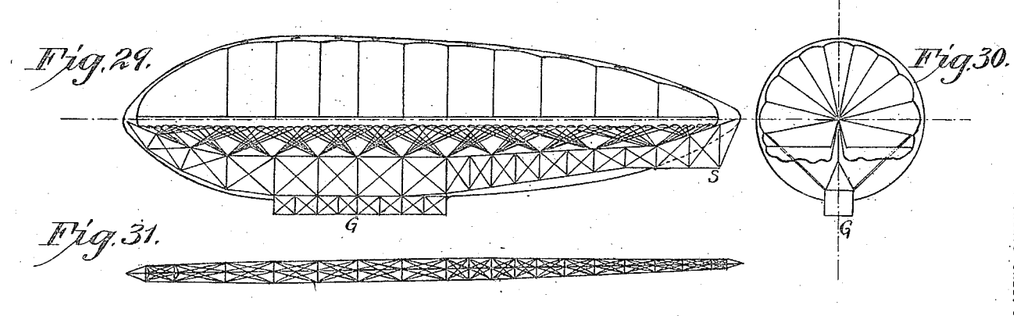
Figs. 29, 30 and 31 show another constructional form of double envelop balloon.

Figs. 29, 30 and 31 show the combination of a balloon provided with a double envelop and diaphragms according to Figs. 11 and 12, and an internal triangular girder suspended from the envelop by means of a single center belt.

In all these and other similar combinations that might be devised the rigid girder may extend beyond the balloon's bow and stern, in the shape of navigating, observing and defense cabins.

In the combinations in which the balloon involves the adoption of an axial rope this rope is drawn tight between the extreme ends of the rigid girder, so as to efficiently contribute to firmly hold the transverse diaphragms in place and therewith to prevent the motion of the gas mass; the same object is achieved by the axial belt alone.

Figure 32:
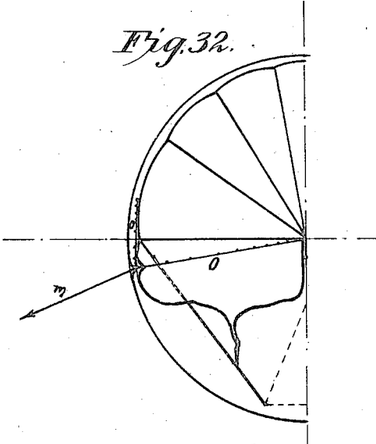
Figs. 32, 33 and 34 show an arrangement for transmitting to an axial rope the stresses from the ropes serving to guide the airship in and out of the shed.
Figure 33:
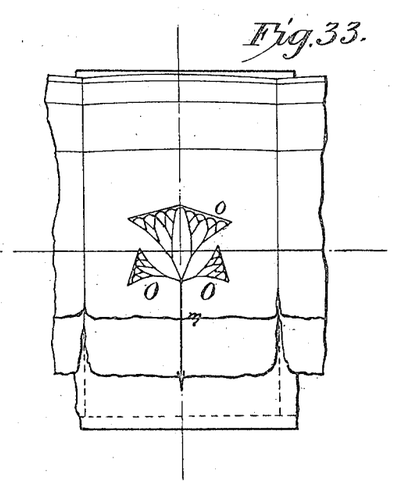
Figure 34:
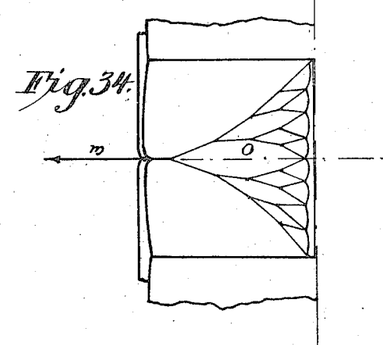

In the combinations fitted with axial rope and belt the ropes serving to guide the airship when she is being warped in and out of the shed can be advantageously secured to the balloon itself without the main stress of the ropes affecting the envelop. Figs. 32, 33 and 34 show an arrangement suitable for this purpose. The operating rope —m—, running in a direction practically radial to the balloon when the rope is subjected to the maximum stress starts from a string-hitch system O integral with the axial belt, and at the point where it prolongs itself beyond the envelop is connected to another minor, circular string hitch system —o— integral with the envelop and tangential to it, this latter system taking up and distributing the secondary stresses tangential to the envelop that are set up by the eventual inclinations of the operating rope with respect to the radius of the balloon while system O takes up and distributes the direct, main stress. The envelop is maintained gas-tight at the point where the rope penetrates it by any known means; for instance by applying to the envelop an elastic diaphragm whose border is fixed to the envelop and whose central portion fits gas-tight around the portion of the rope that passes therethrough.

In nearly all these combinations it is of great advantage to be enabled to readily open and shut the outer wall of the air chamber for inspecting the internal girder, suspension, bottom portion of the gas chamber, etc. An arrangement affording a good solution of this problem is shown in Fig. 22. The edges of the longitudinal aperture provided in the said wall are hemmed with a cord; the aperture is kept closed by threading into these hems, after they have been brought near one another, a continuous set of small C shaped metal tubes the single section of which is readily fitted in place and taken off owing to small cuts by which the continuity of the hem-cord is interrupted at certain intervals.

This same arrangement may serve for the connection of linings and other similar accessories.

Having now particularly described and ascertained the nature of my invention and in what manner the same is to be carried out, I declare that what I claim is:

1. In a dirigible balloon, the combination of a gas container or envelop; a plurality of transverse diaphragms disposed within said envelop and dividing the interior thereof into separate compartments; longitudinal diaphragms also disposed within the interior of said envelop and arranged radially therein, the second-named diaphragms intersecting the first-named diaphragms and being connected thereto along the lines of such intersection; a rigid girder arranged longitudinally at the lower portion of the balloon; and means for transmitting the lifting stresses from said longitudinal diaphragms to said girder.

2. In a dirigible balloon, the combination of a gas container or envelop; a plurality of transverse diaphragms disposed within said envelop and dividing the interior thereof into separate compartments; longitudinal diaphragms also disposed within the interior of said envelop intersecting the first-named diaphragms and connected thereto along the lines of such intersection; a rigid girder disposed within the interior of said envelop and connected thereto; and an axially-disposed flexible element arranged interiorly of said envelop and connected to the ends of said girder and to the central portions of said first-named diaphragms, said second-named diaphragms radiating from said flexible element.

3. In a dirigible balloon, the combination, with a gas container or envelop, and a plurality of intersecting transverse and longitudinal diaphragms disposed within the interior of said envelop; of a rigid girder disposed interiorly of and connected with said envelop; and an axially-disposed canvas strap arranged interiorly of said envelop and connected to the ends of said girder and to the central portions of the transverse diaphragms, the longitudinal diaphragms radiating from said strap.

4. In a dirigible balloon, the combination, with a gas container or envelop, and a plurality of intersecting transverse and longitudinal diaphragms disposed within the interior of said envelop; of operating ropes entering said envelop in a substantially radial direction and secured to said diaphragms.

5. In a dirigible balloon, the combination of a gas container or envelop; an air chamber surrounding the same; a plurality of transverse diaphragms disposed within said envelop and dividing the interior thereof into separate compartments; longitudinal diaphragms also disposed within the interior of said envelop and arranged radially therein, the second-named diaphragms intersecting the first-named diaphragms and being connected thereto along the lines of such intersection; a rigid girder connected with said envelop; and lateral, catenary connections joined at their upper edges to the side portion of the envelop and at their lower edges to said girder, so as to render the external shape of the balloon independent of the degree of inflation of the envelop and of the pressure in the air chamber.

6. In a dirigible balloon, the combination of a gas container or envelop comprising a skeleton framework composed of connected T-shape and cruciform strips of gas-tight, flexible material, and gas-tight, flexible material lap-jointed to the edges of the projecting arms of said strips to form the continuous external wall of the envelop; and a system of inter-connected transverse and longitudinal diaphragms arranged internally of said framework and secured to said arms.

7. In a dirigible balloon, the combination of a gas container, comprising outer and inner coaxially-arranged envelops spaced apart to provide an intermediate air chamber which surrounds the gas envelop; and connecting means therebetween for maintaining the envelops concentric with relation to each other and for causing the outer envelop to be supported by and from the inner envelop; said connecting means comprising two belts or strips of adjustable width arranged longitudinally and along inclined planes at the sides of the balloon and connected at their upper edges to a median line of the inner envelop and at their lower edges to a median line of the outer envelop.

8. In a dirigible balloon, the combination of a gas container or envelop; a plurality of transverse diaphragms disposed within said envelop and dividing the interior thereof into separate compartments; longitudinal diaphragms also disposed within the interior of said envelop and arranged radially therein, the second-named diaphragms intersecting the first-named diaphragms and being connected thereto along the lines of such intersection; and means for transmitting the lifting stresses from said longitudinal diaphragms to the loads to be lifted.

In testimony whereof I hereunto affix my signature in the presence of two witnesses.

ENRICO FORLANINI.

Witnesses:
 ENRICO VERONEL,
 CARLO CARRAINQUES.